(12) United States Patent
Hashimoto et al.

(10) Patent No.: US 8,019,996 B2
(45) Date of Patent: Sep. 13, 2011

(54) METHOD FOR ENCRYPTED COMMUNICATION WITH A COMPUTER SYSTEM AND SYSTEM THEREFOR

(75) Inventors: Yoko Hashimoto, Yokohama (JP); Takahiro Fujishiro, Yokohama (JP); Tadashi Kaji, Yokohama (JP); Osamu Takata, London (GB); Kazuyoshi Hoshino, Tokyo (JP)

(73) Assignee: Hitachi, Ltd., Tokyo (JP)

(*) Notice: Subject to any disclaimer, the term of this patent is extended or adjusted under 35 U.S.C. 154(b) by 869 days.

(21) Appl. No.: 11/907,260

(22) Filed: Oct. 10, 2007

(65) Prior Publication Data

US 2008/0098221 A1   Apr. 24, 2008

(30) Foreign Application Priority Data

Oct. 10, 2006 (JP) .................................. 2006-275944

(51) Int. Cl.
*H04L 9/32* (2006.01)

(52) U.S. Cl. ........ 713/169; 713/168; 713/155; 380/229; 705/67

(58) Field of Classification Search .......... 713/168–169, 713/155–159; 380/229; 705/67
See application file for complete search history.

(56) References Cited

U.S. PATENT DOCUMENTS

| | | | | |
|---|---|---|---|---|
| 6,941,285 | B2* | 9/2005 | Sarcanin ........................ | 705/67 |
| 7,269,723 | B2* | 9/2007 | Cromer et al. .................... | 713/2 |
| 7,571,312 | B2* | 8/2009 | Scarlata et al. ............... | 713/155 |
| 7,594,274 | B2* | 9/2009 | Kim et al. ....................... | 726/26 |
| 7,765,600 | B2* | 7/2010 | Saunders et al. ................ | 726/27 |
| 2001/0049740 | A1* | 12/2001 | Karpoff ......................... | 709/231 |
| 2003/0056063 | A1 | 3/2003 | Hochmuth et al. | |
| 2003/0110259 | A1 | 6/2003 | Chapman et al. | |
| 2003/0145205 | A1* | 7/2003 | Sarcanin ....................... | 713/172 |
| 2003/0204578 | A1* | 10/2003 | Yip et al. ...................... | 709/222 |
| 2003/0237004 | A1* | 12/2003 | Okamura ..................... | 713/201 |
| 2004/0034766 | A1* | 2/2004 | Sakamura et al. ............... | 713/2 |
| 2004/0230863 | A1* | 11/2004 | Buchhorn ....................... | 714/6 |
| 2006/0074949 | A1* | 4/2006 | Haruna et al. ............... | 707/100 |
| 2006/0161765 | A1* | 7/2006 | Cromer et al. ................... | 713/2 |

(Continued)

FOREIGN PATENT DOCUMENTS

JP    2005-229436    8/2005

(Continued)

OTHER PUBLICATIONS

European Search Report issued in European Patent Application No. 07019839.5-2418 dated on Feb. 20, 2008.

(Continued)

*Primary Examiner* — Farid Homayounmehr
(74) *Attorney, Agent, or Firm* — McDermott Will & Emery LLP

(57) ABSTRACT

To solve problems in that a load on a VPN device is large in a case where the number of terminal devices increases in encrypted communication using a VPN technique, and that only communication between the terminal device and the VPN device is encrypted, thus disabling end-to-end encrypted communication, a communication system is provided, including: a terminal device; a plurality of blades; and a management server that manages the blades, in which: the management server selects a blade, authenticates the terminal device and the selected blade, and mediates encrypted communication path establishment between the terminal device and the selected blade; the terminal device and the blade perform encrypted communication without the mediation of the management server; and the management server requests a validation server to authenticate each terminal.

8 Claims, 17 Drawing Sheets

U.S. PATENT DOCUMENTS

| | | | |
|---|---|---|---|
| 2006/0230435 A1* | 10/2006 | Kokumai | 726/4 |
| 2006/0277406 A1 | 12/2006 | Hashimoto et al. | |
| 2007/0105531 A1* | 5/2007 | Schroeder | 455/411 |
| 2007/0220120 A1 | 9/2007 | Tsunehiro et al. | |
| 2008/0228652 A1* | 9/2008 | Chiu | 705/67 |
| 2009/0007234 A1* | 1/2009 | Birger et al. | 726/3 |

FOREIGN PATENT DOCUMENTS

| | | |
|---|---|---|
| JP | 2005-327233 | 11/2005 |
| JP | 2006-352834 | 12/2006 |
| WO | WO 2005/043281 A2 | 5/2005 |
| WO | WO 2005/101205 A1 | 10/2005 |

OTHER PUBLICATIONS

Japanese Office Action, with English translation, issued in Japanese Patent Application No. 2006-275944, mailed Mar. 29, 2011.

Japanese and English Transaction and Examination history of JP 2006-275944.

* cited by examiner

FIG. 12

BLADE USE STATUS TABLE 70

| BLADE IDENTIFICATION INFORMATION | USE STATUS | USER |
|---|---|---|
| Blade_1 | IN USE | out1@aaa.bbb |
| Blade_2 | UNUSED (STOPPED) | — |
| Blade_3 | ALLOCATED | out2@aaa.bbb |
| Blade_4 | UNUSED (STOPPED) | — |
| ... | ... | ... |

FIG. 16

BLADE USE STATUS TABLE 80

| VIRTUAL BLADE ID 81 | BLADE IDENTIFICATION INFORMATION 82 | USE STATUS 83 | USER 84 | READ BLADE ID 85 |
|---|---|---|---|---|
| IN1@aaa.bbb | Blade_1 | IN USE | out1@aaa.bbb | in1@aaa.bbb |
| IN2@aaa.bbb | Blade_2 | ALLOCATED | out2@aaa.bbb | in2@aaa.bbb |
| | Blade_3 | ALLOCATED | out3@aaa.bbb | — |
| | Blade_4 | UNUSED (STOPPED) | — | — |
| ... | ... | ... | ... | ... |

FIG. 18

USER USE AREA MANAGEMENT TABLE 90

| USER ID | STORAGE IDENTIFIER | |
| --- | --- | --- |
| | STORAGE NAME | LOGICAL UNIT |
| out1@aaa.bbb | storage1.aaa.bbb | 0000 |
| out2@aaa.bbb | storage2.aaa.bbb | 0100 |
| out3@aaa.bbb | storage3.aaa.bbb | 0036 |
| ... | ... | ... |

FIG. 19

ADDRESS MANAGEMENT TABLE A0

| USER ID/BLADE ID | IP ADDRESS |
| --- | --- |
| in1@aaa.bbb | 192.138.1.5 |
| out1@aaa.bbb | 192.168.20.3 |
| in2@aaa.bbb | 192.168.2.10 |
| ... | ... |

METHOD FOR ENCRYPTED COMMUNICATION WITH A COMPUTER SYSTEM AND SYSTEM THEREFOR

INCORPORATION BY REFERENCE

This application claims priority based on a Japanese patent application, No. 2006-275944 filed on Oct. 10, 2006, the entire contents of which are incorporated herein by reference.

BACKGROUND OF THE INVENTION

The present invention relates to a technique that performs encrypted communication via a communication network such as the Internet, and more particularly, to a technique that utilizes a computer system which uses a storage device such as a hard disk device via a network from a device connected to the communication network such as the Internet.

Japanese Patent Laid-open Publication No. 2005-327233 (page 13, FIG. 9, hereinafter be referred to as Patent Document 1) discloses a technique in which, in a configuration in which a storage device and blade computers are connected to one another via a network, a user accesses one of the blade computers by using an arbitrary terminal device connected to the network, to use the blade computer as a computer to which the user can freely and individually set an environment or applications. The blade computer refers to a single computer board as one of a plurality of computer boards that are generally used by being stored in a rack. Each blade computer is configured by mounting a CPU, a memory, and the like on an electronic substrate (hereinafter, referred to as a blade).

In a case where an external terminal device connected to an external network such as the Internet accesses the blade connected to an internal network of organizations including companies, a firewall is provided at a boundary between the external network and the internal network to judge whether a user of the external terminal device is authorized. If the user of the external terminal device is authorized, the user can access the blade connected to the internal network. However, Patent Document 1 includes no description of a method that encrypts communication between the external terminal device and the blade.

On the other hand, as a technique that authenticates the external terminal device and encrypts communication, there is a virtual private network (VPN) technique as exemplified by "Alteon SSL VPN", NORTEL NETWORKS, found on p. 2-3 of (http://www.nortel.com/products/01/alteon/sslpvn/collateral/nn102960-073103.pdf) (hereinafter, referred to as Document 2). A description will be given of an example case where the external terminal device connected to the external network such as the Internet performs encrypted communication with an internal terminal device connected to the internal network of an organization including companies.

First, the external terminal device transmits a request for connection to the internal terminal device to a VPN device provided at an entrance of the intra-organization network via the Internet. Here, the VPN device uses a public key certificate (hereinafter, will be referred to as certificate) and the like to authenticate the external terminal device, and confirms that the external terminal device is permitted to access the internal terminal device. Further, the external terminal device uses the certificate and the like to authenticate the VPN device.

When the external terminal device and the VPN device are mutually authenticated, data exchanged between the external terminal device and the VPN device is encrypted by using an encryption key shared by the two devices. In addition, the VPN device connects to the internal terminal device and relays data to be exchanged by the external terminal device and the internal terminal device.

As described above, the external terminal device can communicate with the internal terminal device via the VPN device. Further, the data exchanged between the external terminal device and the VPN device is encrypted, so it is possible to perform secure communication.

Document 2 discloses functions of an appliance that provides the VPN technique as described above.

SUMMARY OF THE INVENTION

The computer system disclosed in Patent Document 1 may employ the VPN technique disclosed in Document 2 for performing secure communication between the terminal device and the blade. However, in the conventional secure communication method using the VPN technique, there is a risk that load on the VPN device may become large when a plurality of terminal devices and a plurality of blades exist, because the VPN device relays all data exchanged among the terminal devices and the blades.

In addition, the encrypted communication method using the VPN technique as disclosed in Document 2 is a method that encrypts communication between the terminal device and the VPN device, and Document 2 does not disclose encrypted communication between the VPN device and the blades. Thus, there is a problem in that plain text is exchanged between the VPN device and the blades.

The present invention has been made in view of the above-mentioned circumstances, and the present invention therefore provides a technique that distributes load in communication and/or a technique that enables communication of higher security by encrypting communication between a terminal device and a blade, when performing secure communication between a terminal device connected to an external network and blades connected to an intra-organization network.

Specifically, the present invention provides a communication system provided with a management server that manages the terminal device and the blades.

The communication system according to the present invention performs secure communication between the terminal device and the blades by the following steps.

First, the terminal device connects to the management server connected to an entrance of the intra-organization network, and the terminal device and the management server perform mutual authentication by using a certificate. When the mutual authentication ends in success, the terminal device and the management server share an encryption key that encrypts data to be exchanged therebetween, thereby establishing an encrypted communication path between the terminal device and the management server.

The management server refers to a blade use status table in which use statuses of the blades are recorded, and selects a blade to be a communication counterpart of the terminal device. Then, the management server transmits to the selected blade instructions to turn on power and activate the blade, and to read information to be used by a user of the external terminal device from a storage based on a user ID. At this time, even if the blade is in a power-off status, a part of the blade that receives the power-on instruction and the activation instruction from the management server is supplied with power and is in an instruction standby status.

When the power is turned on, the blade carries out activation processing and reads information to be used by the external terminal device from the storage connected to the intra-organization network. Then, the blade carries out a step similar to the encrypted communication path establishment step carried out by the terminal device and the management server, to thereby establish an encrypted communication path between the blade and the management server.

After that, the terminal device transmits to the management server a request for connection to the blade that has read the information to be used by the terminal device.

After confirming that both the terminal device and the blade have been authenticated, the management server generates an encryption key that is used in the encrypted communication between the terminal device and the blade. Then, the management server transmits to the blade the connection request from the terminal device to the blade and the encryption key that is used in the encrypted communication between the terminal device and the blade via the encrypted communication path established between the blade and the management server.

The blade then judges whether the terminal device can be connected to the blade and transmits the judgment result to the management server.

When the terminal device and the blade can be connected to each other, the management server notifies the terminal device that the terminal device can be connected to the blade and transmits to the terminal device the encryption key that is used in the encrypted communication between the terminal device and the blade, via the encrypted communication path established between the terminal device and the management server.

By using the encryption key, the terminal device and the blade establish an encrypted communication path to perform secure communication.

Note that the power-on of the blade and the encrypted communication path establishment between the blade and the management server may be carried out in advance instead of the power-on instruction from the management server being a trigger. For example, when a plurality of terminal devices share the same environment and information, the power-on of the blade, reading from the storage by the blade, and encrypted communication path establishment between the blade and the management server may be carried out in advance so that blade selection, generation and transmission of the encryption key, and encrypted communication path establishment between the terminal device and the blade can be carried out immediately after the connection request is transmitted from the terminal device.

In addition, the management server may request another device, that is, a certificate validation server device (hereinafter, will be referred to as validation server) to verify the certificate when authentication is performed between the terminal device and the blade. By verifying the certificate by the validation server, a more accurate authentication can be performed.

Further, the management server may be operated by a third party organization. In other words, the management server may be connected to another intra-organization network different from that to which the internal terminal device is connected.

According to the above-mentioned aspect, encrypted communication can be performed without mediation of the management server after the encrypted communication path is established between the terminal device and the blade. Thus, a load on the management server is reduced as compared to the conventional technique.

Further, according to the above-mentioned aspect, encrypted communication becomes possible via the communication path established between the terminal device and the blade including the intra-organization network, whereby more secure communication can be performed.

In addition, according to the above-mentioned aspect, selection and status management of the blade can be realized by the management server. Thus, there is no need to additionally install a server that manages the blade, whereby costs for server installment can be reduced.

Note that the terminal device according to the above-mentioned aspect may be a communication device that terminates communication in a network managed by the management server. For example, the terminal device may be a gateway device located at a boundary between another network and the network, and the network managed by the management server may be connected to the another network via the gateway device.

According to the present invention, it is possible to distribute a load in communication between the device connected to the external network and the device connected to the intra-organization network, and to perform communication with higher security.

These and other benefits are described throughout the present specification. A further understanding of the nature and advantages of the invention may be realized by reference to the remaining portions of the specification and the attached drawings.

BRIEF DESCRIPTION OF THE DRAWINGS

In the accompanying drawings:

FIG. 12 illustrates contents of a blade use status table retained in the management server according to the first embodiment;

FIG. 16 illustrates contents of a blade use status table retained in the management server according to the second embodiment;

FIG. 18 illustrates contents of a user use area management table retained in the management server according to the first and second embodiments; and FIG. 19 illustrates contents of an address management table retained in the management server according to the first and second embodiments.

DESCRIPTION OF THE EMBODIMENTS

Hereinafter, descriptions will be given of first and second embodiments of the present invention.

First Embodiment

Figure 1:
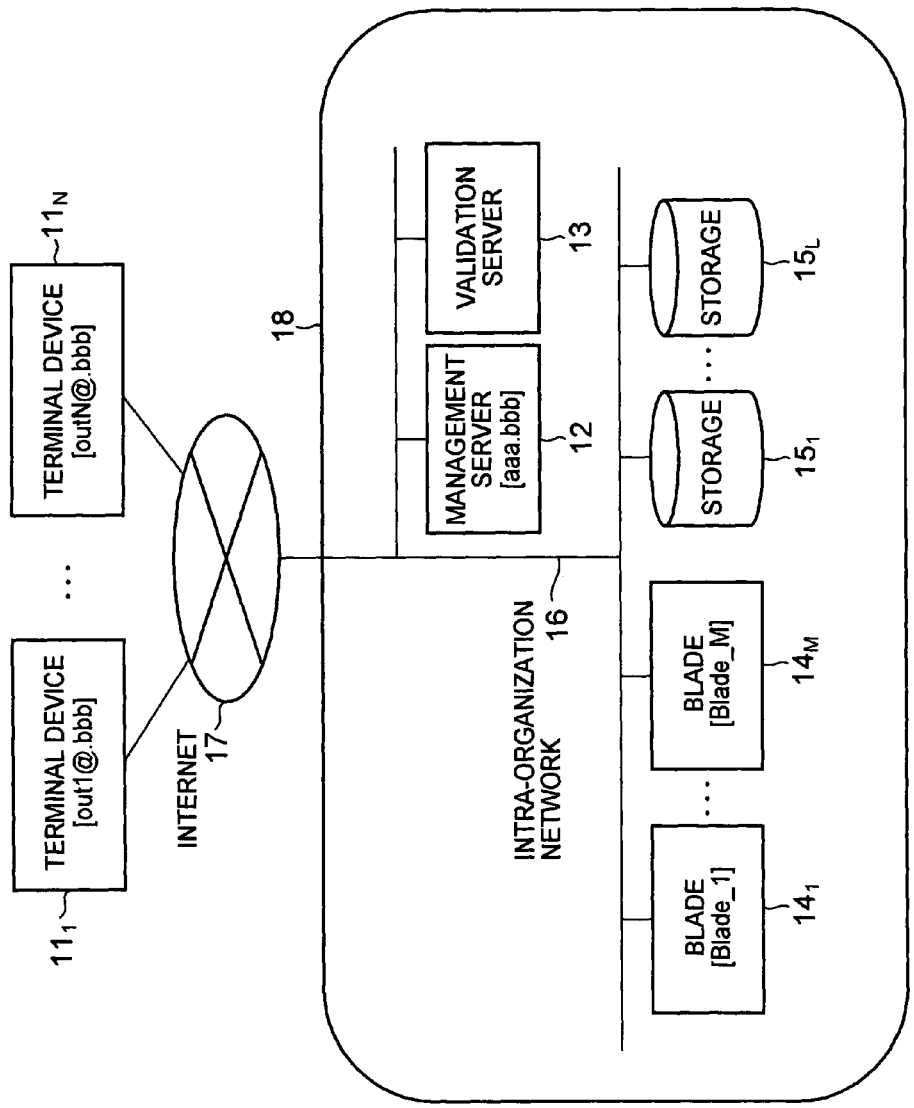
FIG. 1 illustrates a configuration of a communication system according to first and second embodiments of the present invention.

FIG. 1 is a diagram illustrating a configuration of a communication system according to the first and second embodiments of the present invention.

The communication system according to this embodiment is composed of an external network such as the Internet (will be referred to as the Internet) 17, terminal devices $11_1$ to $11_N$ (will generically be referred to as "terminal device 11") connected to the Internet 17, and intra-organization network 16 connected to the Internet 17. The Internet 17 and the intra-organization network 16 may be connected to each other via a device such as a firewall (not shown). When the Internet 17 and the intra-organization network 16 are connected to each other via the firewall, the communication between the terminal device 11 and the management server 12 is set so that the communication therebetween is not blocked by the firewall. Further, each of the networks may be a wired network or a wireless network.

In addition, blades $14_1$ to $14_M$ (will generically be referred to as "blade 14") that are used by users in the organization, storages $15_1$ to $15_L$ (will generically be referred to as "storage 15") storing data used by the users in the organization, a management server 12 that manages communication between each terminal device 11 and blade 14, and a validation server 13 that verifies a certificate in authentication processing of the terminal device 11, the blade 14, and the like are connected to the intra-organization network 16. Note that operation organizations of the management server 12, the validation server 13, the blade 14, and the storage 15 may be different from one another, any two operation organizations thereof may be the same, or all the operation organizations may be the same. In addition, the management server 12 and/or the validation server 13 may further be connected to another intra-organization network.

Next, a description will be given of each device that constitutes the communication system shown in FIG. 1.

First, by referring to FIG. 2, a description will be given of a functional configuration of the terminal device 11 and the blade 14. Note that unless the terminal device 11 and the blade 14 need to be distinguished from each other, each of the devices will simply be referred to as "communication terminal".

The communication terminal includes a processing unit 20a, a storage unit 20b, an input/output unit 20c that displays communication results and through which instructions from the user are received, and a communication unit 20d for communication with other devices via the Internet 17 or the intra-organization network 16.

The processing unit 20a includes an address registration application unit 21 for registration application of an address that specifies a location of the communication terminal on the network, a management-server-communication processing unit 22 that processes communication with the management server 12, a terminal-communication processing unit 23 that processes communication with the communication terminal of a communication counterpart, and a control unit 24 that collectively controls each unit of the communication terminal.

The storage unit 20b includes a private key/certificate retention unit 25 that retains a private key and public key certificate of the blade 14 or a private key and public key certificate of a user who uses the terminal device 11 (hereinafter, will also be referred to as "private key and public key certificate of the terminal device 11" or "private key of the terminal device 11" and "certificate of the terminal device 11", respectively), and an encryption key retention unit 26 that retains an encryption key used for encrypting communication.

Note that the private key and public key certificate that are retained by the private key/certificate retention unit 25 are used by the management server 12 to authenticate the blade 14 or the user of the terminal device 11. Further, the private key and public key certificate of the user of the terminal device 11 may be stored in advance in a storage medium having portability, such as an IC card, and the storage medium may be inserted into a reader of the terminal device 11 so that the storage medium serves as the private key/certificate retention unit 25 of the terminal device 11 (description on the storage medium and the reader will be given later).

Next, the management server 12 will be described with reference to FIG. 3.

The management server 12 includes a processing unit 30a, a storage unit 30b, an input/output unit 30c that displays communication results and through which instructions from the user are received, and a communication unit 30d for communication with other devices or devices connected to the Internet 17 via the intra-organization network 16.

The processing unit 30a includes an address registration/retrieval unit 31 that registers an address in an address database (DB) 38 upon reception of an address registration application from the communication terminal or retrieves an address of the communication terminal, a blade status management unit 32 that reflects a use status of the blade on the blade management database (DB) 39 or allocates the blade to be used by the terminal device 11 upon reception of the connection request from the terminal device 11, a key generation unit 33 that generates an encryption key for encryption of inter-communication terminal communication, a terminal-communication processing unit 34 that processes communication with the communication terminal, a validation-server-communication processing unit 35 that processes communication with the validation server 13, and a control unit 36 that collectively controls each unit of the management server 12.

The storage unit 30b includes a private key/certificate retention unit 37 that retains a private key and public key certificate of the management server 12 used by the communication terminal to authenticate the management server, the address DB 38 that retains an address management table A0 for managing the address of the communication terminal, the blade management DB 39 that retains a blade use status table 70 indicating a use status of the blade, and a user use area management database (DB) (3A) that retains a user use area management table 90 indicating which part of the storage retains data to be used by the user. The user use area management table is set in advance with a user ID 91 and a storage identifier 92 so that it is possible to grasp which storage stores which user data.

Next, the validation server 13 will be described with reference to FIG. 4.

The validation server 13 includes a processing unit 40a, a storage unit 40b, an input/output unit 40c that displays communication results and through which instructions from the user are received, and a communication unit 40d for communication with other devices or devices connected to the Internet 17 via the intra-organization network 16.

The processing unit 40a includes a certificate validation unit 42 that verifies, upon reception of a validation request from the management server 12, the requested certificate, a management-server-communication processing unit 43 that processes communication with the management server 12, and a control unit 44 that collectively controls each unit of the validation server 13.

The storage unit 40b includes a certificate retention unit 45 that retains a certificate or invalidation information acquired from an authentication institution, which is necessary for the certificate validation unit 42 to verify the certificate.

Figure 2:
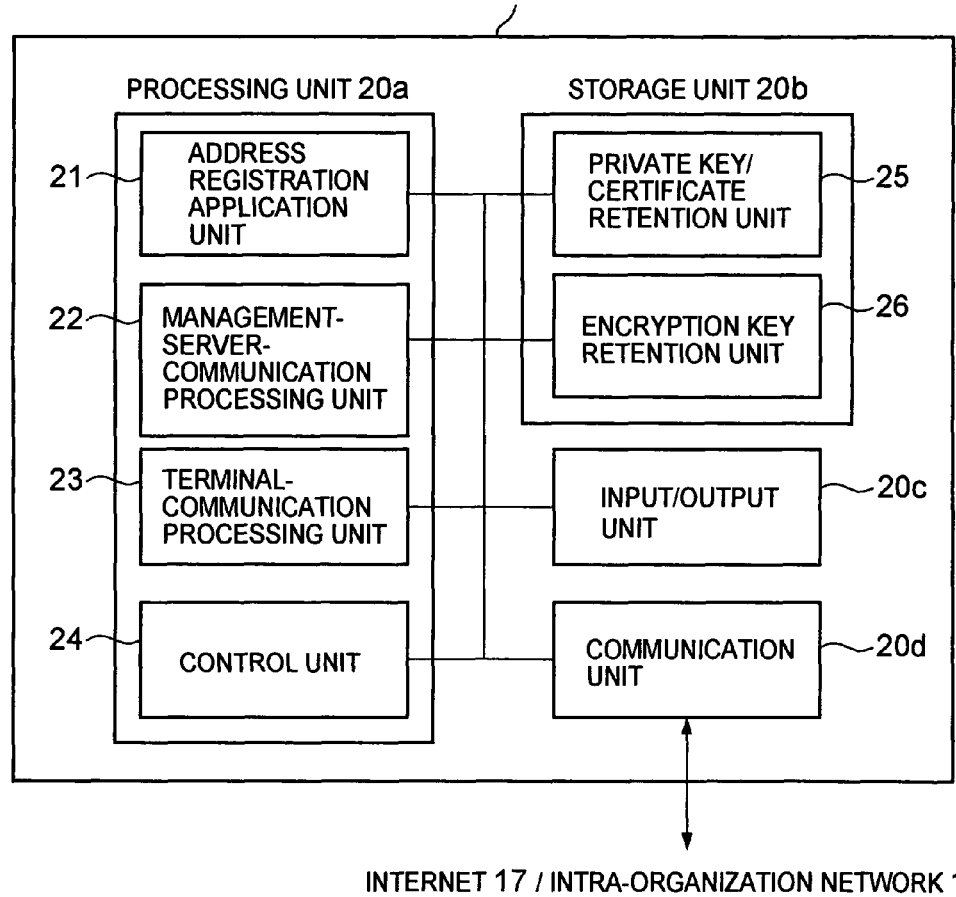
FIG. 2 illustrates a schematic configuration of a terminal device/blade.
Figure 3:
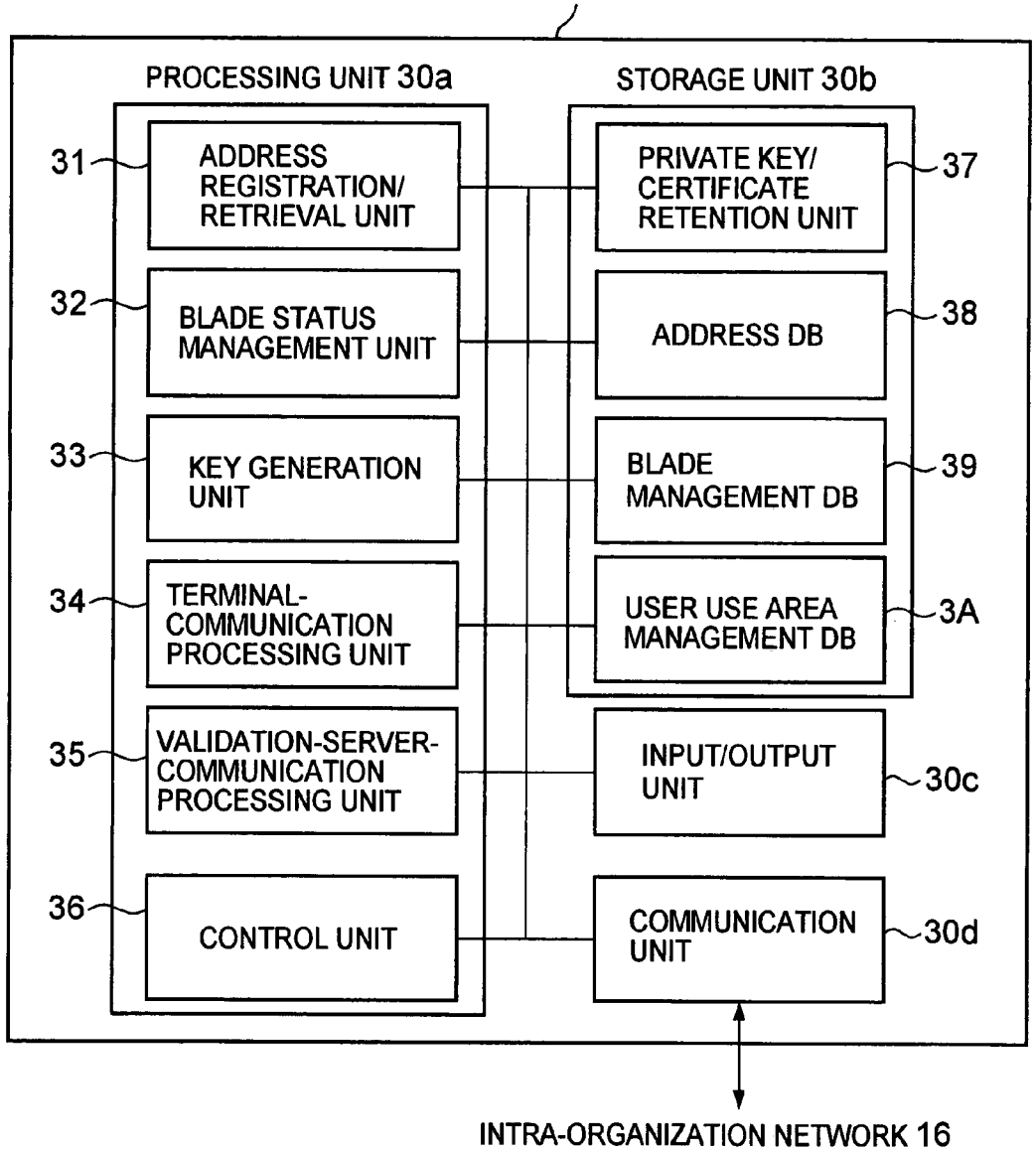
FIG. 3 illustrates a schematic configuration of a management server.
Figure 4:
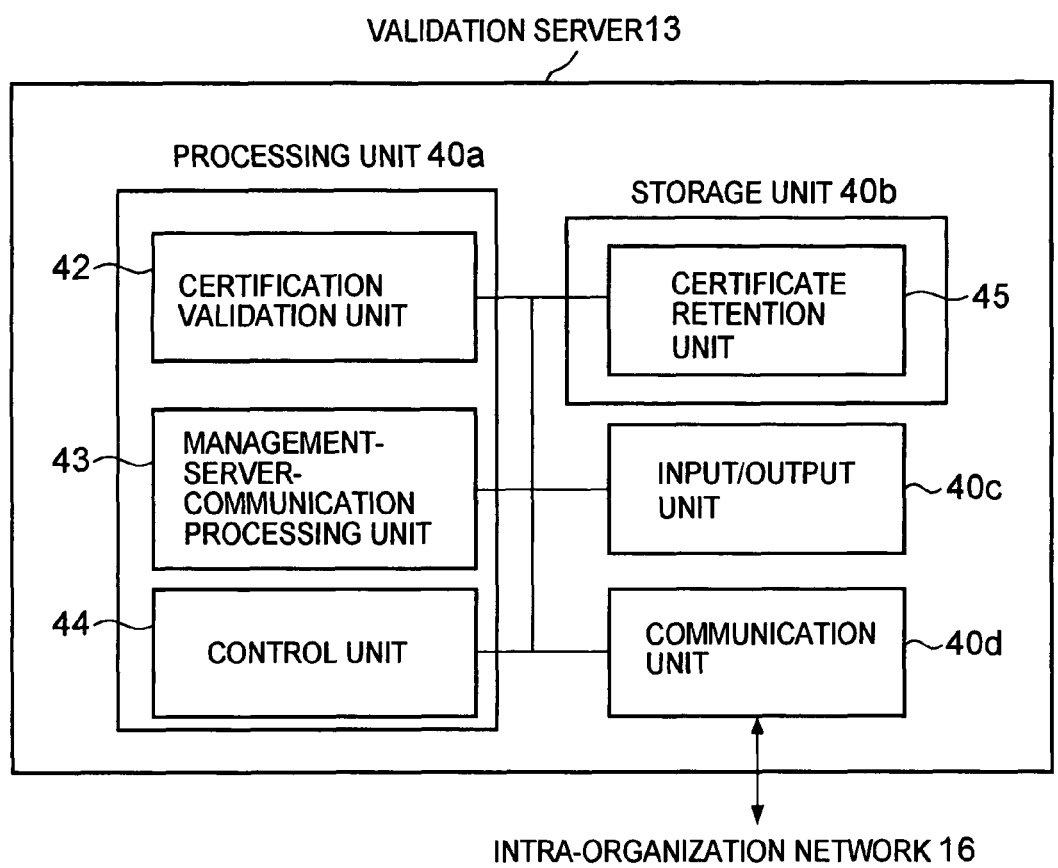
FIG. 4 illustrates a schematic configuration of a validation server.
Figure 5:
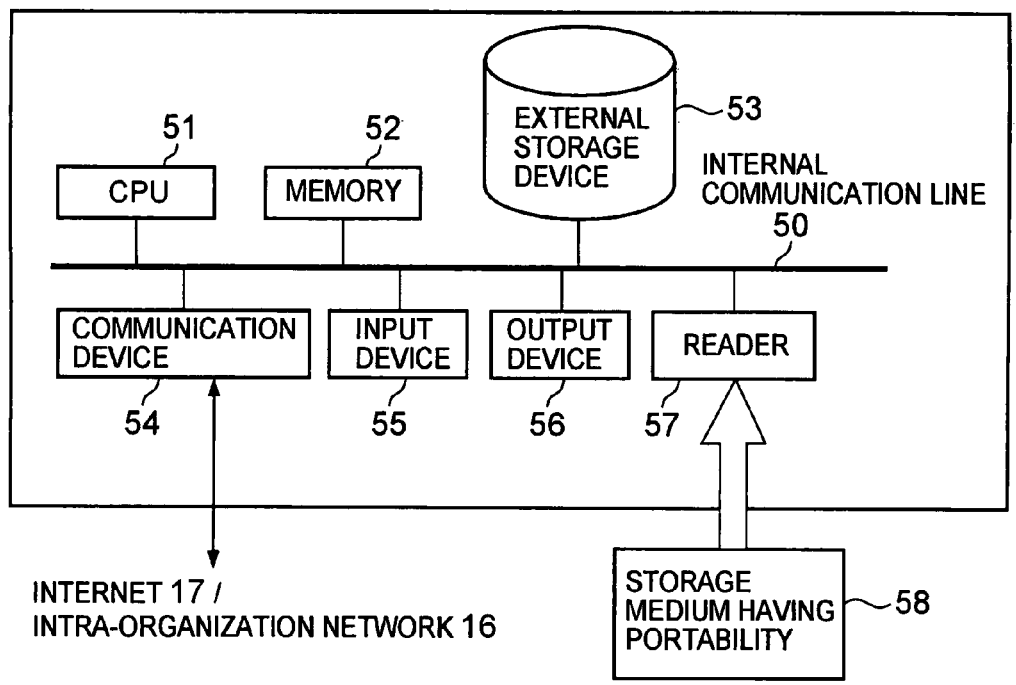
FIG. 5 illustrates a hardware configuration of each of the terminal device, the management server, and the validation server.

Note that the processing units of each of the terminal device 11, the management server 12, and the validation server 13 respectively illustrated in FIGS. 2 to 4 can be realized in a generally-employed computer including, as illustrated in FIG. 5, for example, a CPU 51, a memory 52, an external storage device 53 such as a hard disk, a communication device 54 that performs communication with another device via the Internet 17 or the intra-organization network 16, an input device 55 such as a keyboard or a mouse, an output device 56 such as a display device or a printer, a reader 57 that reads information from a storage medium 58 having portability, and an internal communication line 50 connecting those devices with one another, and by the CPU 51 executing predetermined programs loaded to the memory 52.

Those programs may be stored in advance in the memory 52 or external storage device 53 of the computer, or may be loaded if necessary from the detachable storage medium 58 applicable to the computer or from another device via a communication medium (e.g., the Internet 17, the intra-organization network 16, or a carrier wave or a digital signal that propagates through one of the above-mentioned networks).

In addition, a part or all of the processing units can be configured as hardware.

Further, the communication terminal may have any configuration other than that shown in FIG. 5 as long as the communication terminal can realize the functional configuration shown in FIG. 2. The communication terminal may be a device equipped with a function equivalent to the communication device 54 which can connect to the Internet 17 and the intra-organization network 16. For example, not only routers, PCs, and PDAs, but also domestic appliances such as a television, a refrigerator, an air-conditioning, and a microwave can serve as the communication terminal with the configuration similar to the that shown in FIG. 5.

Figure 6:
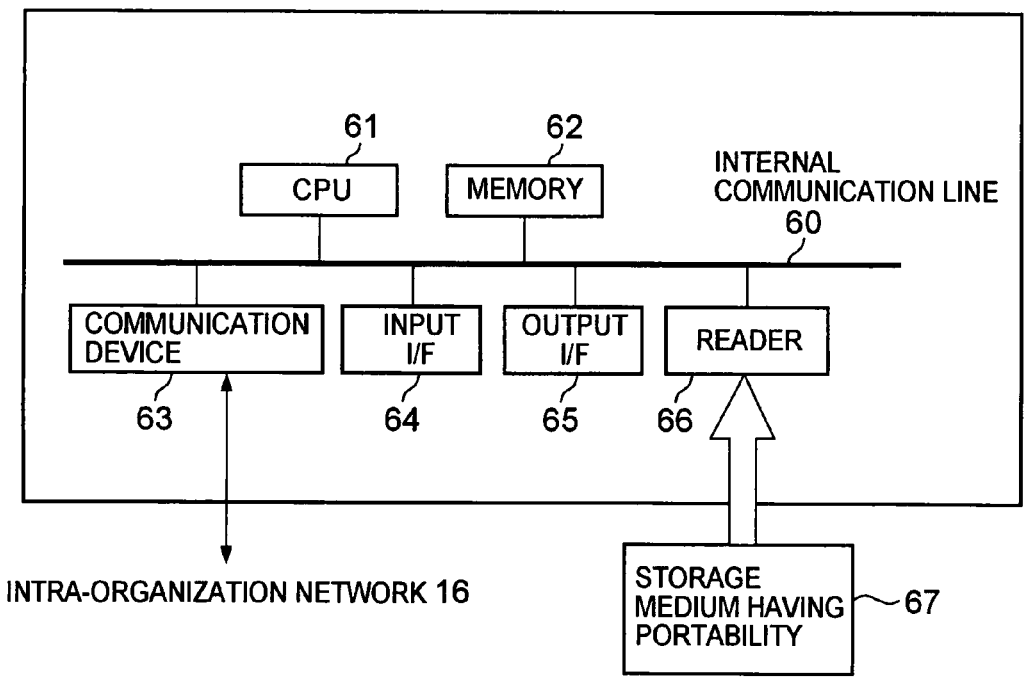
FIG. 6 illustrates a hardware configuration of the blade.

Further, the processing units of the blade 14 illustrated in FIG. 2 can be realized in a computer including, as illustrated in FIG. 6, for example, a CPU 61, a memory 62, a communication device 63 that performs communication with another device via the intra-organization network 16, an input interface 64 through which information from an input device such as a keyboard or a mouse is exchanged, an output interface 65 through which information is exchanged with an output device such as a display device or a printer, a reader 66 that reads information from a storage medium 67 having portability, and an internal communication line 60 connecting those devices with one another, and by the CPU 61 executing predetermined programs loaded to the memory 62. In addition, the external storage device such as a hard disk included in the generally-employed computer is not equipped in the blade 14, whereas the storage 15 serves as the external storage device of the blade 14.

Those programs may be stored in advance in the memory 62 of the computer or the storage 15, or may be loaded if necessary from the detachable storage medium 67 applicable to the blade 14 or from another device via a communication medium (e.g., the intra-organization network 16, the Internet 17, or a carrier wave or a digital signal that propagates through one of the above-mentioned networks).

In addition, a part or all of the processing units can be configured as hardware.

Next, a description will be given of an operation of the communication system according to this embodiment.

The operation of the communication system according to this embodiment is divided into an operation for establishing an encrypted communication path between the communication terminal (terminal device 11 or blade 14) and the management server, and an operation for establishing an encrypted communication path between the terminal device 11 and the blade 14.

First, the operation for establishing the encrypted communication path between the communication terminal and the management server will be described.

Figure 7:
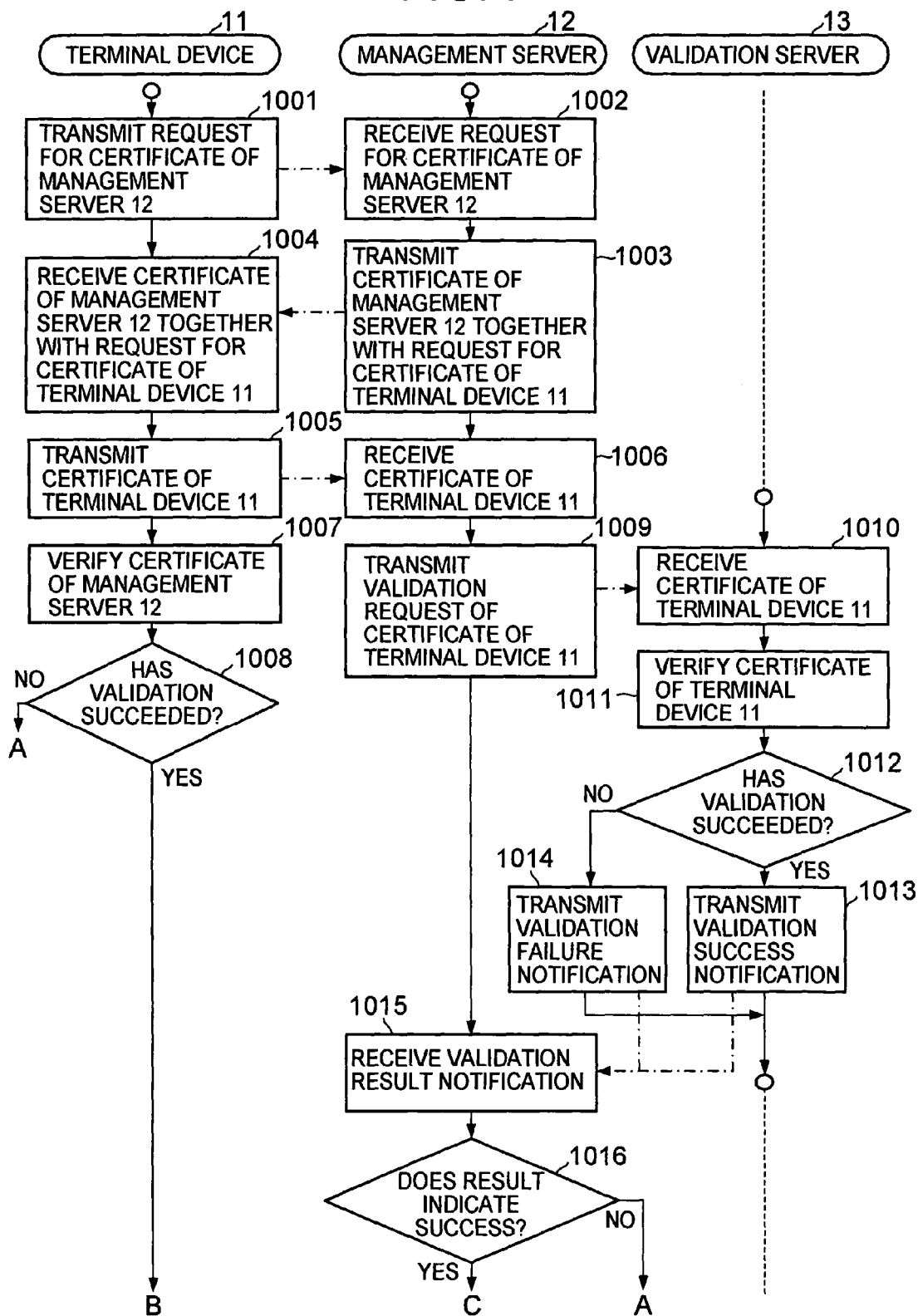
FIG. 7 illustrates a processing procedure until the terminal device and the management server perform mutual authentication for establishing an encrypted communication path.
Figure 8:
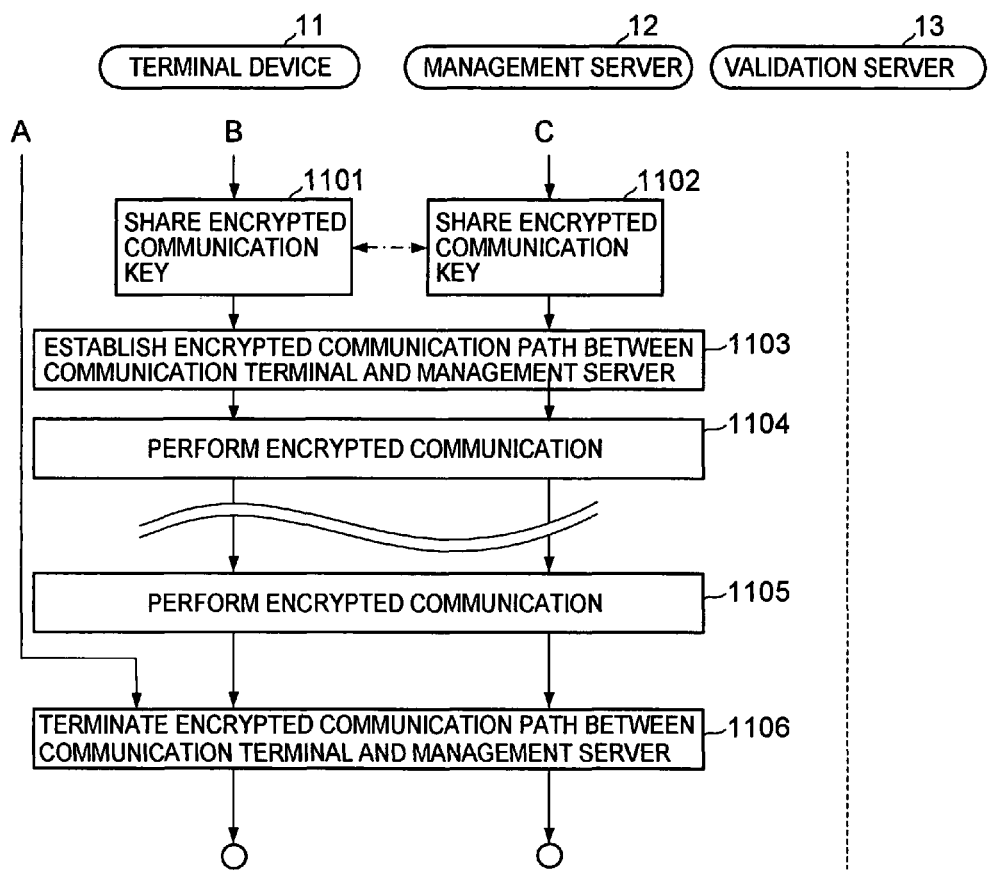
FIG. 8 illustrates a processing procedure in which the terminal device and the management server establish the encrypted communication path and terminate the encrypted communication path.

FIGS. 7 and 8 are flowcharts that illustrate the operation for establishing the encrypted communication path between the communication terminal and the management server according to this embodiment, and illustrate a case of establishing the encrypted communication path between the terminal device 11 and the management server 12.

The management-server-communication processing unit 22 of the terminal device 11 transmits a request for a certificate of the management server 12 to the management server 12 for authentication (Step 1001 of FIG. 7). The terminal-communication processing unit 34 of the management server 12 that has received the request (Step 1002) extracts the certificate of the management server 12 from the private key/certificate retention unit 37 and transmits the extracted certificate as a response together with a request for a certificate of the terminal device 11 as the communication counterpart (Step 1003). The management-server-communication processing unit 22 of the terminal device 11 that has received the request (Step 1004) extracts the certificate of the terminal device 11 from the private key/certificate retention unit 25 and transmits the certificate to the management server 12 (Step 1005).

The management-server-communication processing unit 22 of the terminal device 11 verifies the certificate of the management server 12 received in Step 1004 (Step 1007) and checks whether the transmission source of the certificate is pretending to be the management server 12. When the validation of the certificate of the management server 12 ends in failure (No in Step 1008), the communication is ended because the management server cannot be authenticated (Step 1106). When the validation of the certificate of the management server 12 ends in success (Yes in Step 1008), the process advances to the next step.

The terminal-communication processing unit 34 of the management server 12 receives the certificate from the terminal device 11 (Step 1006) and transmits a certificate validation request for the terminal device 11 to the validation server 13 via the validation-server-communication processing unit 35 for verifying the certificate (Step 1009). The validation server 13 receives the validation request (Step 1010) and verifies the certificate requested for validation in the certificate validation unit 42 (Step 1011).

When the validation of the certificate of the terminal device 11 ends in success (Yes in Step 1012), the management-server-communication processing unit 43 of the validation server 13 transmits a notification informing the certificate validation success to the management server 12 (Step 1013). When the certificate validation of the terminal device 11 ends in failure (No in Step 1012), the management-server-communication processing unit 43 transmits a notification informing the certificate validation failure to the management server 12 (Step 1014). The terminal-communication processing unit 34 of the management server 12 receives the validation result from the validation server 13 via the validation-server-communication processing unit 35 (Step 1015). When the validation result indicates validation failure (No in Step 1016), the communication is ended because the terminal device 11 cannot be authenticated (Step 1106). When the validation result of the certificate of the terminal device 11 indicates success (Yes in Step 1016), the process advances to the next step.

When the terminal device 11 and the management server 12 are mutually authenticated (Yes in Step 1008 and Yes in Step 1016), the management-server-communication processing unit 22 of the terminal device 11 and the terminal-communication processing unit 34 of the management server 12 share an encrypted communication key (will be referred to as encryption key) for encrypting a communication path (Steps 1101 and 1102 of FIG. 8). The sharing of the encryption key leads to the establishment of the encrypted communication path between the terminal device 11 and the management server 12 (Step 1103). Thus, the management-server-communication processing unit 22 of the terminal device 11 and the terminal-communication processing unit 34 of the management server 12 perform encrypted communication by using the encryption key (Step 1104).

Upon ending the encrypted communication, the management-server-communication processing unit 22 of the terminal device 11 and the terminal-communication processing unit 34 of the management server 12 terminate the encrypted communication path (Step 1106).

By executing the steps as described above, the terminal device 11 and the management server 12 can establish the encrypted communication path after mutually verifying the communication counterpart thereof.

Next, a description will be given of an operation for establishing an encrypted communication path between the terminal device 11 and the blade 14.

For establishing an encrypted communication path between the terminal device 11 and the blade 14, address information of each communication terminal needs to be registered in the management server 12 in advance. By referring to FIG. 9, an address registration operation will be described.

Figure 9:
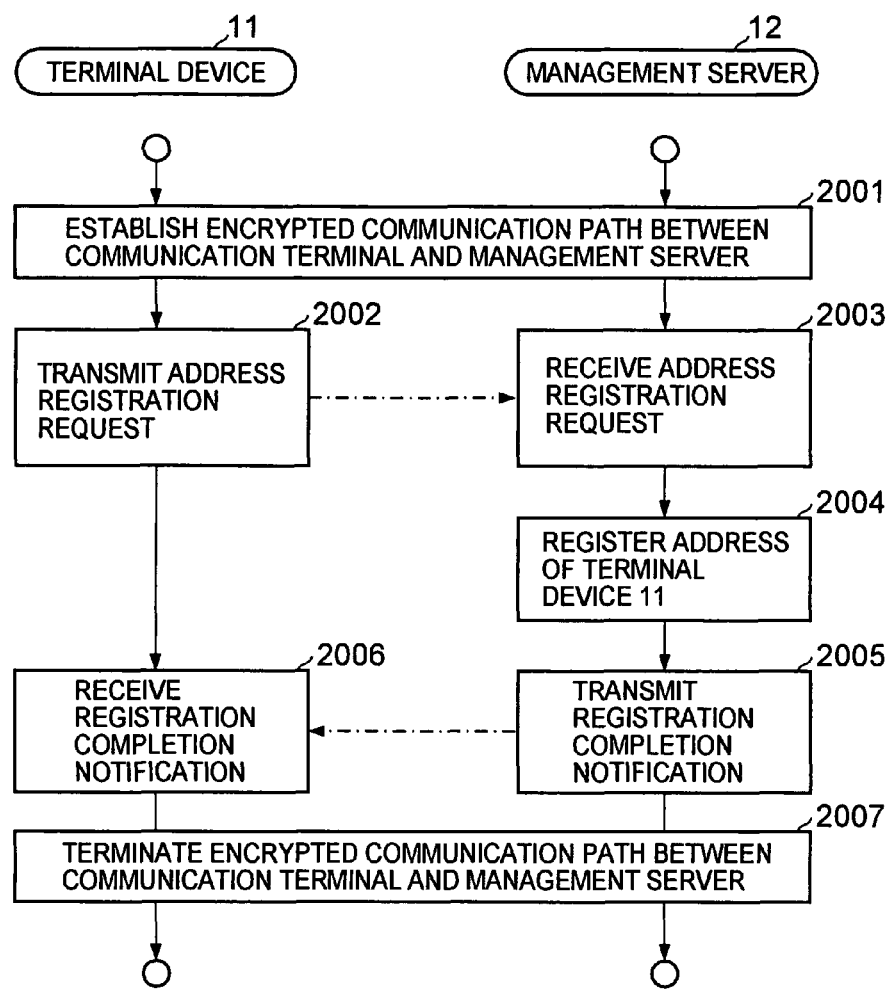
FIG. 9 illustrates a processing procedure in which the terminal device registers an address of the terminal device to the management server.

FIG. 9 is a flowchart illustrating the operation of registering an address of the communication terminal to the management server 12, and illustrates a case where the terminal device 11 registers an address thereof to the management server 12.

First, the terminal device 11 and the management server 12 establish an encrypted communication path therebetween by executing the processes of Steps 1001 to 1016 and processes of Steps 1101 to 1103 (Step 2001). After the encrypted communication path establishment, the address registration application unit 21 of the terminal device 11 transmits a registration request of an address of the terminal device 11 to the management server 12 (Step 2002). Upon reception of the registration request (Step 2003), the address registration/retrieval unit 31 of the management server 12 registers the address of the terminal device 11 in the address management table A0 retained in the address DB 38 (Step 2004).

Note that the address information to be registered contains information that specifies an object requesting registration (in this case, a user of the terminal device 11) (hereinafter, will be referred to as "user ID" in a case of the user of the terminal device and "blade ID" in a case of the blade) and information that specifies a location of the object requesting registration (in this case, the corresponding communication terminal) on the network, such as an IP address. Those pieces of information are respectively registered as a user ID/blade ID (A1) and an IP address (A2) of the address management table A0 in association with each other.

Any fixed IDs in a domain may be used as the user ID and the blade ID. For example, a communication terminal name or a MAC address of the communication terminal can be used. Further, in a closed domain such as that in companies, information including a mail address of the user of the communication terminal, an SIP-URI of the communication terminal, and a fully qualified domain name (FQDN) of the communication terminal can also be used. In addition, the management server 12 associates the user ID and the blade ID with the certificate of the terminal device 11 and the certificate of the blade 14, respectively, and manages those IDs. For example, the user ID and the blade ID may be associated with the certificate of the terminal device 11 and the certificate of the blade 14, respectively, by having each certificate include a description of the corresponding one of the user ID and the blade ID.

After the registration completion, the management server 12 transmits a registration completion notification to the terminal device 11 (Step 2005). Upon reception of the registration completion notification by the terminal device 11 (Step 2006), the terminal device 11 and the management server 12 execute termination processing of the encrypted communication path. By executing the steps described above, the terminal device 11 can register its own address in the management server 12.

When the terminal device 11 performs encrypted communication with the blade 14, addresses of both communication terminals are registered in the management server 12 in advance. In other words, the blade 14 also executes the steps similar to those of FIG. 9 to register it own address in the management server 12.

Note that because the blades 14 are often installed in a fixed manner in the intra-organization network 16, the registration processing does not need to be carried out for each blade 14, and an administrator may allocate and register the addresses in the management server 12 in advance.

In addition, the communication terminal can delete the address registered in the management server 12. In the case of deleting the address, processing in which the "register" in the processing shown in FIG. 9 is replaced by "delete" is carried out.

Further, regarding the address registration, when the address allocated to the communication terminal is changed, the registration processing shown in FIG. 9 needs to be executed again. For example, when the communication terminal is dynamically allocated with an address from an additionally-provided DHCP server or the like, there is a fear that the address is changed when turning ON/OFF the power of the communication terminal or resetting the communication terminal. Further, when the communication terminal ends the network connection to connect with another network at another location, there is a fear that the address thereof is changed. In such cases, the registration processing shown in FIG. 9 is executed again to register a new address in the management server 12.

Next, a description will be given of an operation in which the terminal device 11 establishes an encrypted communication path between the blade 14 via the management server 12.

Figure 10:
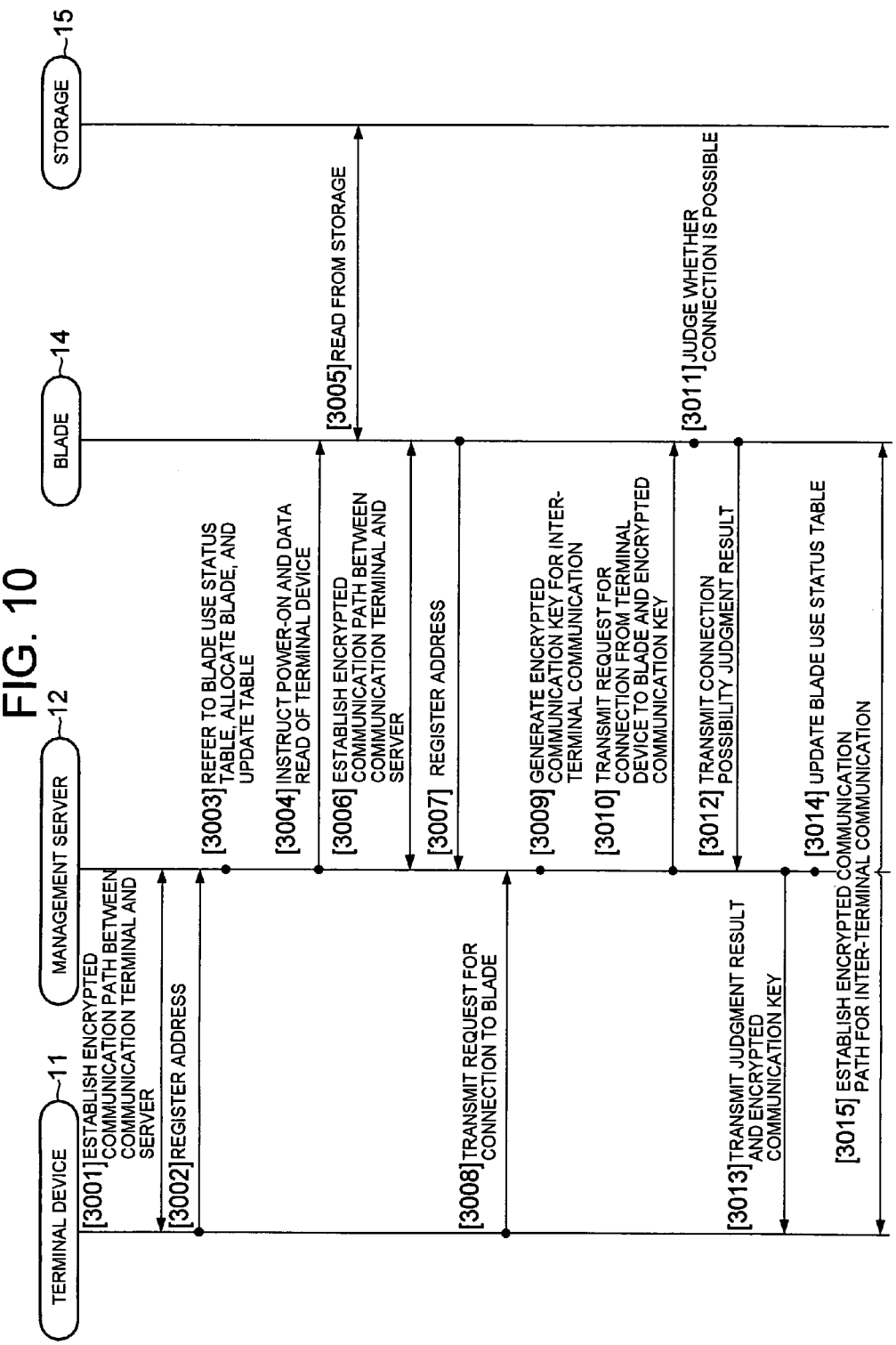
FIG. 10 illustrates a processing procedure until the terminal device establishes the encrypted communication path between the terminal device and the blade via the management server according to the first embodiment.
Figure 11:
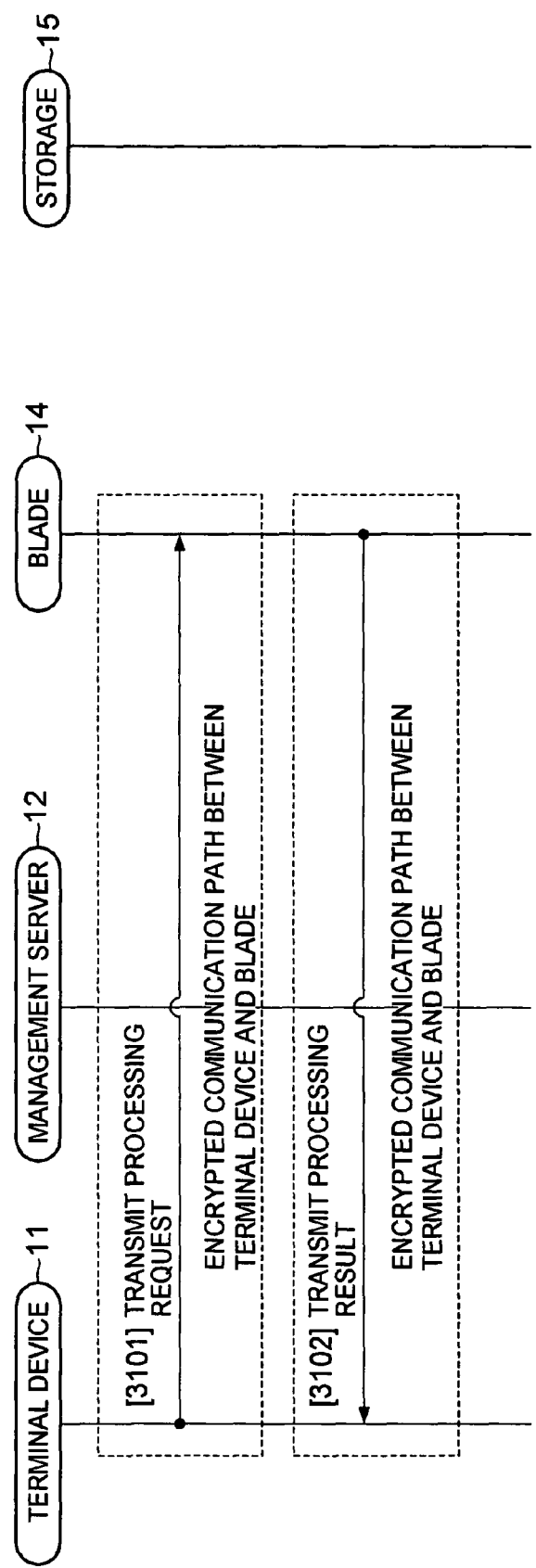
FIG. 11 illustrates a processing procedure in which the terminal device establishes the encrypted communication path between the terminal device and the blade via the management server and carries out processing by using the encrypted communication path according to the first embodiment.

FIGS. 10 and 11 are flowcharts illustrating the operation of establishing an encrypted communication path between the terminal device 11 and the blade 14.

First, the management server 12 and the terminal device 11 establish an encrypted communication path between the terminal device 11 and the management server 12 by executing the processes of Steps 1001 to 1016 and processes of Steps 1101 to 1103 (Step 3001). Then, when the address of the terminal device 11 is not yet registered or the registered address is changed, the address of the terminal device 11 is registered in the management server 12 by executing the processes of Steps 2002 to 2006 (Step 3002).

After the address registration processing as requested by the terminal device 11, the blade status management unit 32 of the management server 12 refers to the blade use status table 70 as shown in FIG. 12, selects a blade to be used by the terminal device 11, and updates the blade use status table 70 (Step 3003). Specifically, the blade use status table 70 is retained in the blade management DB 39 of the management server 12, and includes blade identification information 71, a use status 72 indicating whether the blade is in use, and a user 73 indicating a user who is using the blade in the case where the blade is in use.

The blade status management unit 32 of the management server 12 selects, from the blade identification information 71 included in the blade use status table 70, the blade identification information 71 whose use status 72 is "unused (stopped)" as a connection destination blade. Then, the blade status management unit 32 updates the use status 72 corresponding to the selected blade identification information 71 to "allocated", and registers the user ID of the terminal device 11 as the user 73.

Subsequently, the blade status management unit 32 of the management server 12 transmits to the blade 14 selected in Step 3003 instructions on the power-on, activation, and to read user data of the terminal device 11 from the storage 15 (Step 3004). Note that the data read in this case is instructed based on a storage identifier 92 corresponding to the user ID obtained by retrieving the user use area management table 90 with the user ID of the terminal device 11 registered in Step 3002 as a key.

When the power is turned on upon reception of the instruction on the power-on from the management server 12, the blade 14 reads the user data of the terminal device 11 from the storage 15 (Step 3005). Then, upon completion of the data read, the blade 14 and the management server 12 execute the processes of Steps 1001 to 1016 of FIG. 7 and the processes of Steps 1101 to 1103 of FIG. 8 to establish an encrypted communication path (Step 3006), and execute the processes of Steps 2002 to 2006 of FIG. 9 to register the address of the blade 14 in the management server 12 (Step 3007). In other words, the blade ID contained in the data read by the blade 14 from the storage 15 and the IP address of the blade 14 are registered in the management server 12. Note that the IP address of the blade 14 may be set in advance in the data read from the storage 15 or may be acquired dynamically from the additionally-provided DHCP server.

Subsequently, the management-server-communication processing unit 22 of the terminal device 11 transmits a request for connection to the blade 14 to the management server 12 (Step 3008). Note that the connection request includes the blade ID of the blade 14 that is the connection counterpart. The blade ID is contained in the user data read from the storage 15 and the blade ID that is used by the user is uniquely set. Further, it is assumed that the user (i.e., terminal device 11) knows the own blade ID in advance.

Here, the connection request made in Step 3008 may be executed right after the address registration of the terminal device 11 in Step 3002 instead of after the address registration of the blade 14 (Step 3007). Specifically, the management server 12 may execute the process of the blade allocation (Step 3003) and processes thereafter after receiving the request for connection to the blade 14 from the terminal device 11.

The terminal-communication processing unit 34 of the management server 12 that has received the connection request generates an encryption key to be used for the encrypted communication path between the terminal device 11 and the blade 14 via the key generation unit 33 (Step 3009). Then, the terminal-communication processing unit 34 of the management server 12 transmits the request for connection to the blade 14 from the terminal device 11 and the encryption key generated in Step 3009 to the blade 14 (Step 3010). The encryption key may be generated by, for example, a method disclosed in Japanese Patent Laid-open Publication No. 2005-303485 (method involving registering in advance usable setting information for encrypted communication in the management server 12 by the terminal device 11 and the blade 14, selecting common setting information in the registered setting information by the management server 12, and generating an encryption key according to the selected setting information by the management server 12).

The management-server-communication processing unit 22 of the blade 14 that has received the request and the encryption key judges whether the terminal device 11 can be connected to the blade 14 (whether connection is busy) (Step 3011) and transmits the connection possibility judgment result to the management server 12 (Step 3012). The terminal-communication processing unit 34 of the management server 12 transmits the connection possibility judgment result and, if the judgment result indicates that the connection can be made, the encryption key generated in Step 3009, to the terminal device 11 (Step 3013). Then, the terminal-communication processing unit 34 of the management server 12 updates the blade use status table 70 (Step 3014). Specifically, the terminal-communication processing unit 34 updates the use status 72 corresponding to the blade 14 to "in use".

Upon reception of the judgment result by the management-server-communication processing unit 22 of the terminal device 11, the terminal-communication processing unit 23 of the terminal device 11 and the terminal-communication processing unit 23 of the blade 14 establish an encrypted communication path by using the encryption key received in Steps 3010 and 3013 (Step 3015).

The terminal-communication processing unit 23 of the terminal device 11 uses the encrypted communication path established between the terminal device 11 and the blade 14 to transmit a processing request to the blade 14 (Step 3101 of FIG. 11). The blade 14 receives the processing request via the terminal-communication processing unit 23 and executes processing according to the request. Then, the terminal-communication processing unit 23 of the blade 14 uses the encrypted communication path established between the blade 14 and the terminal device 11 to transmit the result of executing the requested processing, or screen output information and the like regarding the processing to the terminal device 11 (Step 3102). The terminal device 11 processes the processing result or the output information received via the terminal-communication processing unit 23 and outputs the processed information to the input/output unit 20c so that the information is displayed on a screen or the like.

The terminal device 11 can terminate the encrypted communication path when the encrypted communication path established between the terminal device 11 and the blade 14 becomes unnecessary. In the description below, a description will be given of an operation in which the terminal device 11 terminates the encrypted communication path established between the terminal device 11 and the blade 14.

Figure 13:
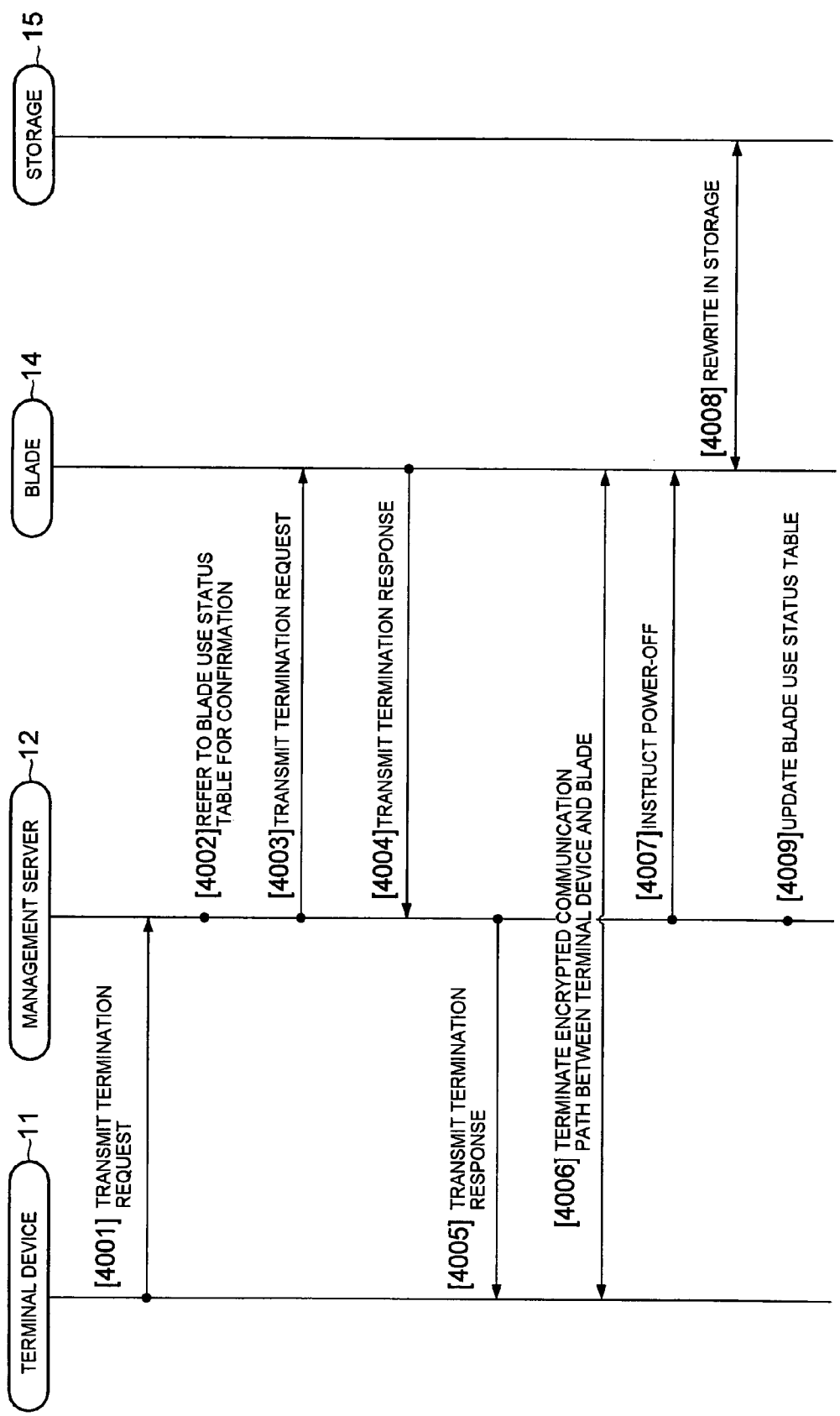
FIG. 13 illustrates a processing procedure until the terminal device terminates the encrypted communication path between the terminal device and the blade via the management server according to the first embodiment.

FIG. 13 is a flowchart illustrating the operation of terminating the encrypted communication path established between the terminal device 11 and the blade 14.

First, the management-server-communication processing unit 22 of the terminal device 11 transmits a termination request of the encrypted communication path with respect to the blade 14 to the management server 12 (Step 4001). The terminal-communication processing unit 34 of the management server 12 that has received the request refers to the blade use status table 70 via the blade status management unit 32 so that the terminal device 11 can confirm that the blade 14 is in use (Step 4002).

The terminal-communication processing unit 34 of the management server 12 transmits to the blade 14 the termination request of the encrypted communication path established between the terminal device 11 and the blade 14 (Step 4003), and the management-server-communication processing unit 22 of the blade 14 that has received the request transmits a termination response to the management server 12 (Step 4004). Upon reception of the termination response from the blade 14, the terminal-communication processing unit 34 of the management server 12 transmits the termination response to the terminal device 11 (Step 4005).

Then, the terminal-communication processing unit 23 of the terminal device 11 and the terminal-communication processing unit 23 of the blade 14 discard the information used for the encrypted communication path establishment (e.g., encryption key and IP address) and terminate the encrypted communication path (Step 4006).

The blade status management unit 32 of the management server 12 transmits a power-off instruction to the blade 14 (Step 4007). Upon reception of the power-off instruction, the blade 14 rewrites data to the storage 15 and cuts off the power supply (Step 4008).

Further, the blade status management unit 32 of the management server 12 updates the blade use status table 70 (Step 4009). Specifically, the blade status management unit 32 changes the use status 72 corresponding to the blade identification information 71 of the blade use status table 70 to "unused (stopped)", and deletes the user ID of the terminal device 11 from the user 73.

By executing the steps described above, the terminal device 11 can terminate the encrypted communication path established with respect to the blade 14.

As illustrated in the flowcharts of FIGS. 10 and 11, the management server 12 authenticates each of the user of the terminal device 11 and the blade 14, and when the validity of both terminals is confirmed, the encrypted communication path can be established between the terminal device 11 and the blade 14. In addition, after the encrypted communication path is established between the terminal device 11 and the blade 14, the terminal device 11 and the blade 14 can perform encrypted communication without the mediation of the management server 12. Thus, secure communication can be performed without imparting a load on the management server 12. Further, because the entire communication between the terminal device 11 and the blade 14 can be encrypted, communication can be performed with higher security.

Further, because the selection and status management of the blade 14 can be realized in the management server 12, an additional server does not need to be provided for managing the blade 14, which leads to a reduction in costs for server installment.

Second Embodiment

A second embodiment of the present invention will be described hereinafter.

The second embodiment differs from the first embodiment in that a virtual blade ID is provided. In transmitting a request for connection to the blade 14 to the management server 12, the terminal device 11 incorporates in the connection request a virtual blade ID allocated to a virtual blade in place of the blade ID that corresponds to the user of the terminal device 11. Users of a plurality of terminal devices 11 use the same virtual blade ID. Further, the management server 12 converts the virtual blade ID into actual blade IDs corresponding to the respective users.

In this embodiment, a description will be given of the operation in which the terminal device 11 establishes an encrypted communication path with respect to the blade 14 via the management server 12.

Figure 14:
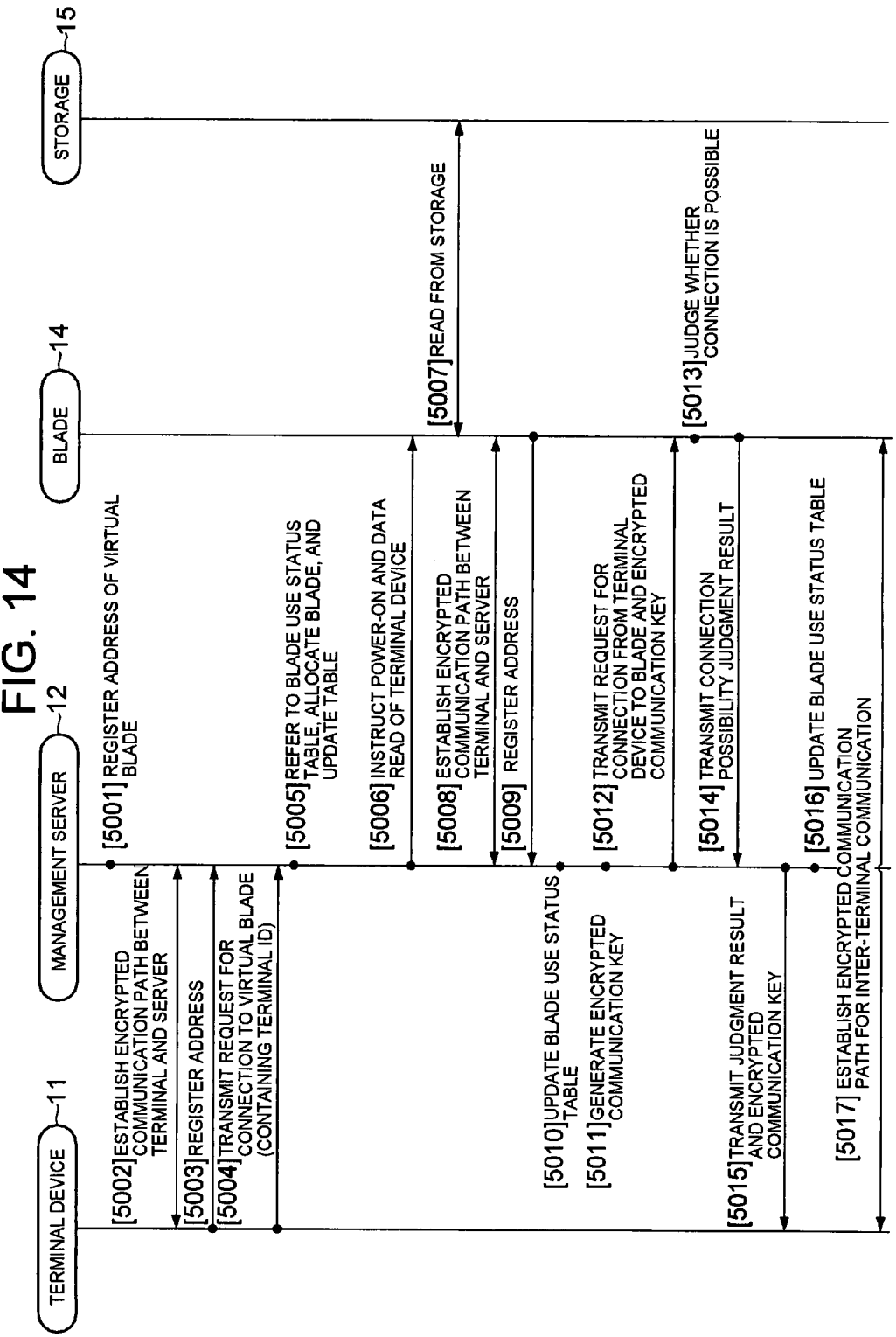
FIG. 14 illustrates a processing procedure until the terminal device establishes the encrypted communication path between the terminal device and the blade via the management server according to the second embodiment.
Figure 15:
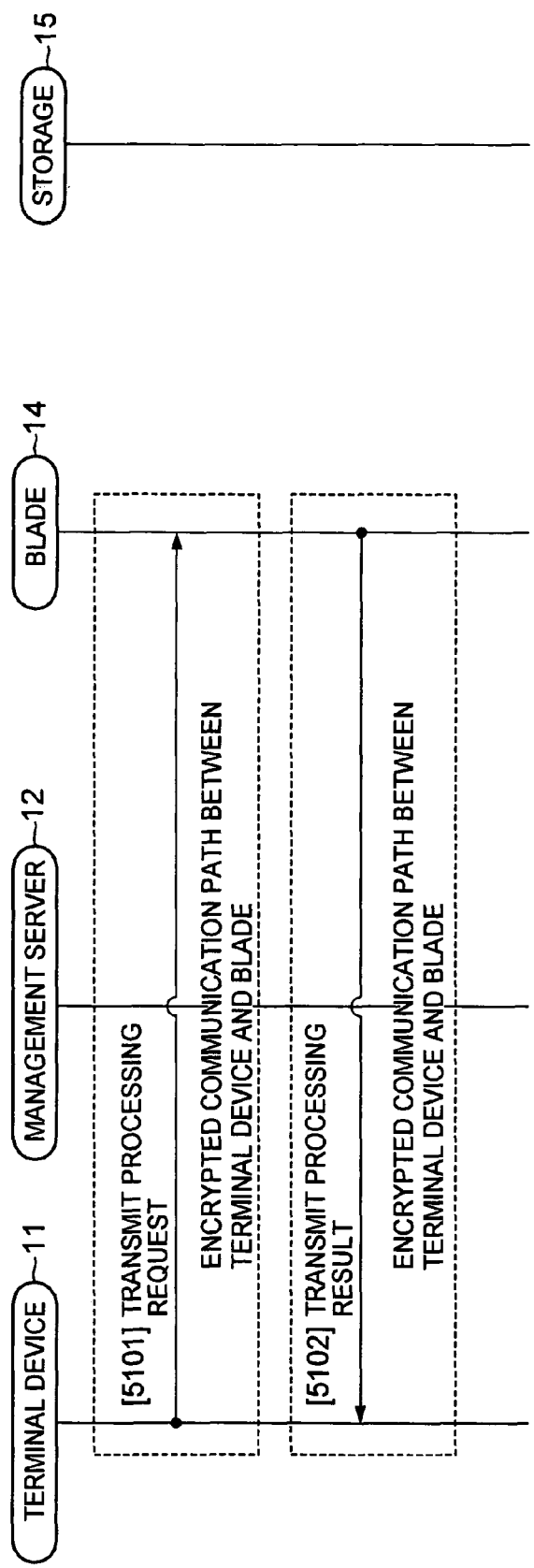
FIG. 15 illustrates a processing procedure in which the terminal device establishes the encrypted communication path between the terminal device and the blade via the management server and carries out processing by using the encrypted communication path according to the second embodiment.

FIGS. 14 and 15 are flowcharts illustrating the operation of establishing an encrypted communication path between the terminal device 11 and the blade 14.

First, the address registration/retrieval unit 31 of the management server 12 registers an address of the virtual blade in the address management table A0 retained in the address DB 38 (Step 5001). Specifically, the address registration/retrieval unit 31 registers the virtual blade ID as the user ID/blade ID (A1) and the virtual IP address as the IP address (A2). It is assumed that the virtual blade ID is notified to each terminal device 11.

The terminal device 11 and the management server 12 establish an encrypted communication path between the terminal device 11 and the management server 12 by executing the processes of Steps 1001 to 1016 and processes of Steps 1101 to 1103 (Step 5002). Then, when the address of the terminal device 11 is not yet registered or the registered address is changed, the address of the terminal device 11 is registered in the management server 12 by executing the processes of Steps 2002 to 2006 (Step 5003).

The management-server-communication processing unit 22 of the terminal device 11 transmits a request for connection to the virtual blade to the management server 12 (Step 5004). Note that the connection request contains the virtual blade ID of the virtual blade.

Upon reception of the connection request from the terminal device 11, the blade status management unit 32 of the management server 12 refers to a blade use status table 80 as shown in FIG. 16 to select a blade to be used by the terminal device 11, and updates the blade use status table 80 (Step 5005).

The blade use status table 80 is retained in the blade management DB 39 of the management server 12 and includes a virtual blade ID 81 of the virtual blade, blade identification information 82 indicating a selectable blade in a case where a connection request with respect to the virtual blade ID is transmitted, a use status 83 indicating whether the blade is in use, a user 84 indicating a user using the blade in use, and a blade ID contained in the data read from the storage 15 to be used by the user (read blade ID 85).

The blade status management unit 32 of the management server 12 refers to the blade use status table 80 and retrieves a corresponding virtual blade ID from the virtual blade ID 81 with the virtual blade ID contained in the connection request as the key, and selects blade identification information 82 whose use status 83 is "unused (stopped)" from the blade identification information 82 corresponding to the virtual blade ID as a connection destination blade. Then, the blade status management unit 32 updates the use status 83 of the selected blade identification information 82 to "allocated" and registers the user ID of the terminal device 11 as the user 84.

Subsequently, the blade status management unit 32 of the management server 12 transmits to the blade 14 selected in Step 5005 instructions on the power-on, activation, and to read user data of the terminal device 11 from the storage 15 (Step 5006). Note that the data read in this case is instructed based on a storage identifier 92 corresponding to the user ID obtained by retrieving the user use area management table 90 with the user ID of the terminal device 11 registered in Step 5003 as a key.

When the power is turned on upon reception of the instruction on the power-on from the management server 12, the blade 14 reads the user data of the terminal device 11 from the storage 15 (Step 5007). Then, upon completion of the data read, the blade 14 and the management server 12 execute the processes of Steps 1001 to 1016 of FIG. 7 and the processes of Steps 1101 to 1103 of FIG. 8 to establish an encrypted communication path (Step 5008), and execute the processes of Steps 2002 to 2006 of FIG. 9 to register the address of the blade 14 in the management server 12 (Step 5009). In other words, the blade ID contained in the data read by the blade 14 from the storage 15 and the IP address of the blade 14 are registered in the management server 12. Note that the IP address of the blade 14 may be set in advance in the data read from the storage 15 or may be acquired dynamically from the additionally-provided DHCP server.

The blade status management unit 32 of the management server 12 includes the blade ID as the read blade ID 85 corresponding to the blade identification information 82 from among the pieces of address information of the blade 14 registered in Step 5009 (Step 5010).

The terminal-communication processing unit 34 of the management server 12 generates an encryption key to be used for the encrypted communication path between the terminal device 11 and the blade 14 via the key generation unit 33 (Step 5011). Then, the terminal-communication processing unit 34 of the management server 12 transmits the request for connection to the blade 14 from the terminal device 11 and the encryption key generated in Step 5011 to the blade 14 (Step 5012). As in the first embodiment, the encryption key may be generated by, for example, a method disclosed in Japanese Patent Laid-open Publication No. 2005-303485.

The management-server-communication processing unit 22 of the blade 14 that has received the request and the encryption key judges whether the terminal device 11 can be connected to the blade 14 (Step 5013) and transmits the connection possibility judgment result to the management server 12 (Step 5014). The terminal-communication processing unit 34 of the management server 12 transmits the connection possibility judgment result and, if the judgment result indicates that the connection can be made, the encryption key generated in Step 5011, to the terminal device 11 (Step 5015). Then, the terminal-communication processing unit 34 of the management server 12 updates the blade use status table 80 (Step 5016). Specifically, the terminal-communication processing unit 34 updates the use status 83 corresponding to the blade 14 to "in use".

Upon reception of the judgment result by the management-server-communication processing unit 22 of the terminal device 11, the terminal-communication processing unit 23 of the terminal device 11 and the terminal-communication processing unit 23 of the blade 14 establish an encrypted communication path by using the encryption key received in Steps 5012 and 5015 (Step 5017).

The terminal-communication processing unit 23 of the terminal device 11 uses the encrypted communication path established between the terminal device 11 and the blade 14 to transmit a processing request to the blade 14 (Step 5101 of FIG. 15). The blade 14 receives the processing request via the terminal-communication processing unit 23 and executes processing according to the request. Then, the terminal-communication processing unit 23 of the blade 14 uses the encrypted communication path established between the blade 14 and the terminal device 11 to transmit the result of executing the requested processing, or screen output information and the like regarding the processing to the terminal device 11 (Step 5102). The terminal device 11 processes the processing result or the output information received via the terminal-communication processing unit 23 and outputs the processed information to the input/output unit 20c so that the information is displayed on a screen or the like.

The terminal device 11 can terminate the encrypted communication path when the encrypted communication path established between the terminal device 11 and the blade 14 becomes unnecessary. A description will be given of an operation in which the terminal device 11 terminates the encrypted communication path established between the terminal device 11 and the blade 14 according to this embodiment.

Figure 17:
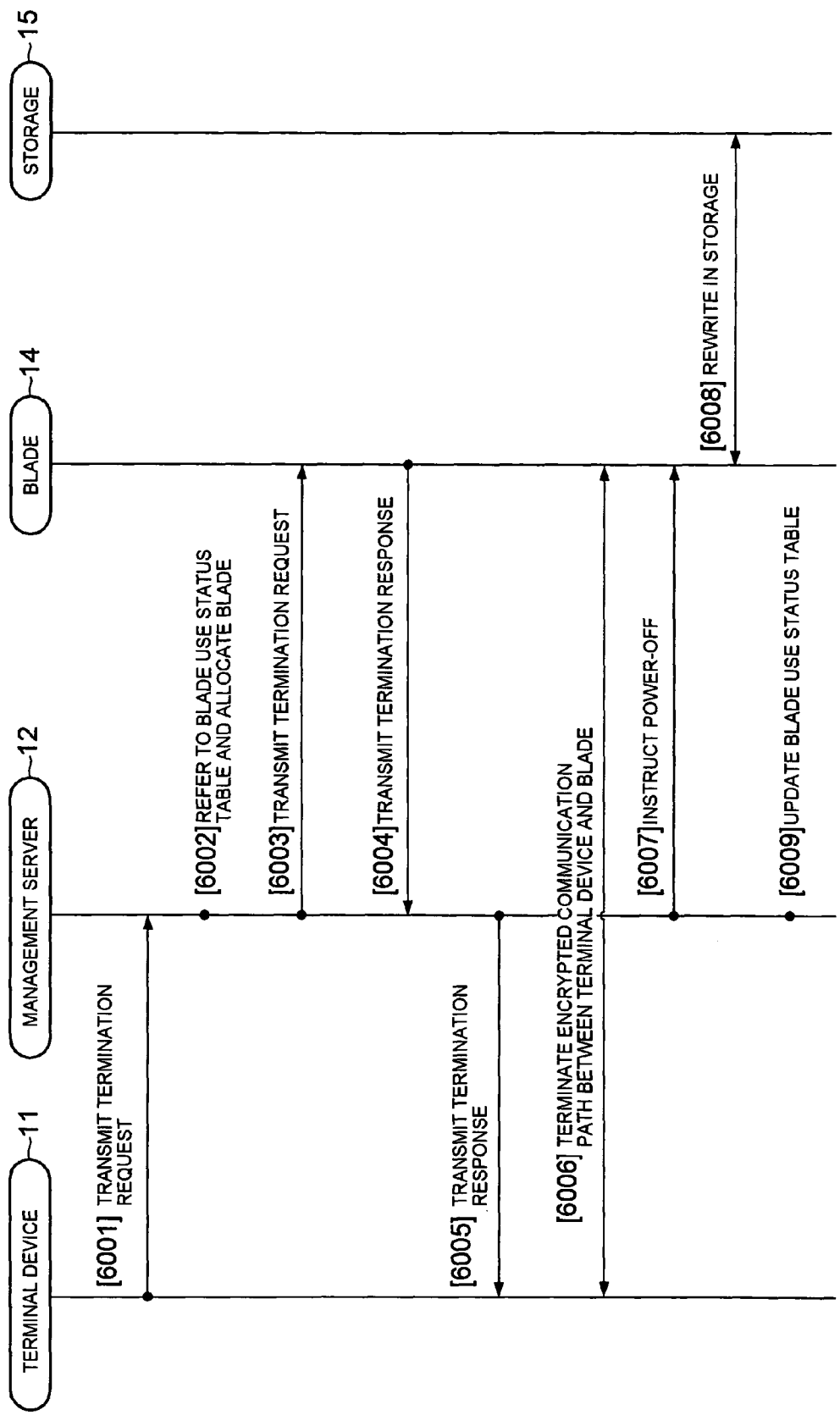
FIG. 17 illustrates a processing procedure until the terminal device terminates the encrypted communication path between the terminal device and the blade via the management server according to the second embodiment.

FIG. 17 is a flowchart illustrating the operation of terminating the encrypted communication path established between the terminal device 11 and the blade 14.

First, the management-server-communication processing unit 22 of the terminal device 11 transmits a termination request of the encrypted communication path with respect to the blade 14 to the management server 12 (Step 6001). Note that the termination request in this case contains the virtual blade ID of the virtual blade.

The terminal-communication processing unit 34 of the management server 12 that has received the request refers to the blade use status table 80 via the blade status management unit 32 to select the blade identification information 82 whose use status 83 is "in use" from among the blade identification information 82 corresponding to the virtual blade ID (Step 6002).

The terminal-communication processing unit 34 of the management server 12 transmits to the blade 14 selected in Step 6002 the termination request of the encrypted communication path established between the terminal device 11 and the blade 14 (Step 6003), and the management-server-communication processing unit 22 of the blade 14 that has received the request transmits a termination response to the management server 12 (Step 6004). Upon reception of the termination response from the blade 14, the terminal-communication processing unit 34 of the management server 12 transmits the termination response to the terminal device 11 (Step 6005).

Then, the terminal-communication processing unit 23 of the terminal device 11 and the terminal-communication processing unit 23 of the blade 14 discard the information used for the encrypted communication path establishment (e.g., encryption key and IP address) and terminate the encrypted communication path (Step 6006).

The blade status management unit 32 of the management server 12 transmits a power-off instruction to the blade 14 (Step 6007). Upon reception of the power-off instruction, the blade 14 rewrites data to the storage 15 and cuts off the power supply (Step 6008).

Further, the blade status management unit 32 of the management server 12 updates the blade use status table 80 (Step 6009). Specifically, the blade status management unit 32 changes the use status 83 corresponding to the blade identification information 82 of the blade use status table 80 to "unused (stopped)", deletes the user ID of the terminal device 11 from the user 84, and deletes the blade ID of the blade 14 from the read blade ID 85.

By executing the steps described above, the terminal device 11 can terminate the encrypted communication path established with respect to the blade 14.

As illustrated in the flowcharts of FIGS. 14 and 15, the management server 12 authenticates each of the user of the terminal device 11 and the blade 14, and when the validity of both terminals is confirmed, the encrypted communication path can be established between the terminal device 11 and the blade 14. In addition, after the encrypted communication path is established between the terminal device 11 and the blade 14, the terminal device 11 and the blade 14 can perform encrypted communication without the mediation of the management server 12. Thus, secure communication can be performed without imparting a load on the management server 12. Further, because the entire communication between the terminal device 11 and the blade 14 can be encrypted, communication can be performed with higher security.

In addition, in this embodiment, by using the virtual blade ID of the virtual blade, the actual blade ID of the blade 14 is prevented from being leaked on the network, whereby security can be enhanced. For example, in a case where a virtual blade ID is used, if a malicious third party tries to attack the blade 14 with the blade ID as the key, because no actual blade that corresponds to the virtual blade ID exists, the third party cannot set any blade as the attacking target.

In this embodiment, the terminal device 11 used by a user reads the user information from the storage 15 to the blade 14 in starting communication with the blade 14. However, the present invention is not limited thereto. The storage 15 does not need to be provided if data to be used by each user is stored in each blade 14 in advance.

In this case, the user 84 and the read blade ID 85 of the blade use status table 80 include the user ID and the blade ID corresponding to the user, respectively.

Further, the processes of Steps 5005, 5006 (except the power-on processing), and 5007 of FIG. 14 can be omitted in establishing an encrypted communication path between the terminal device 11 and the blade 14. In addition, the processes of Steps 6002 and 6008 of FIG. 17 can be omitted in terminating the encrypted communication path between the terminal device 11 and the blade 14.

In addition, because the selection and status management of the blade 14 can be realized in the management server 12, no additional server needs to be provided for managing the blade 14, which leads to a reduction in costs for server installment.

The first and second embodiments illustrate communication in which the terminal device 11 is designated as the communication counterpart. However, a user using the terminal device 11 may be designated as the communication counterpart. When designating the user using the terminal device 11 as the communication counterpart, the terminal device 11 only needs to be configured such that a public key certificate and user ID of the user are stored in advance in the storage medium 58 having portability, and an attribute of the user is read and stored by the terminal device 11 by inserting the storage medium 58 into the reader 57 of the terminal device 11. With such configuration, the terminal device 11 can specify a user using the terminal device 11 and accept the designation as the communication counterpart. Further, with such a configuration that the user attribute is deleted from the terminal device 11 when the user takes out the storage medium 58 having portability from the reader 57, personal information can favorably be prevented from being leaked.

With the configuration as described above, when the user attribute is stored in the terminal device 11, the user ID and address of the terminal device 11 are registered in the management server 12 through the address registration processing shown in FIG. 9. When the user attribute is deleted, by executing the processing in which the "register" of FIG. 9 is replaced by "delete", the management server 12 can judge whether the user is using the terminal device 11 upon reception of a connection request from another terminal device 11. In addition, when the user is using the terminal device 11, the management server 12 can connect the terminal devices 11 without the connection requester having to care about which terminal device 11 the user is using.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A communication system, comprising:
   a plurality of computer boards connected to an intra-organization network;
   a terminal device that connects to an external network to access the plurality of computer boards; and
   a management server that manages the plurality of computer boards and the terminal device and retains a computer board use status table for managing use status of the plurality of computer boards, and assigns a virtual computer board ID to at least one of the plurality of computer boards in the computer board use status table;
   wherein:
   the terminal device and the management server execute a terminal device-to-management server encrypted communication path establishment step that performs mutual authentication and establishes an encrypted communication path therebetween;
   the management server executes a computer board allocation step that selects any one of the plurality of computer boards as a connection destination computer board, and instructs activation of the selected connection destination computer board;

the activated connection destination computer board executes a computer board-to-management server encrypted communication path establishment step that performs authentication with the management server and establishes an encrypted communication path therebetween; and the terminal device executes a terminal device-to-computer board encrypted communication path establishment step that establishes via the management server an encrypted communication path between the terminal device and the activated connection destination computer board, which does not pass the management server, wherein:

in the computer board allocation step, the terminal device transmits a request for connection to a virtual computer board, which designates, as a connection destination, any of virtual computer board IDs included in the computer board use status table, to the management server;

the management server selects, as the connection destination computer board, one of the plurality of computer boards that corresponds to the virtual computer board ID designated by the request for connection and that is unused, by referring to the computer board use status table; and in the terminal device-to-computer board encrypted communication path establishment step, the management server converts the virtual computer board ID designated by the request for connection received from the terminal device, into a computer board ID assigned to the activated connection destination computer board, and transmits the request for connection into which the converted computer board ID is incorporated, to the connection destination computer board.

2. A communication system according to claim 1, wherein:

in the computer board allocation step, the management server refers to the computer board use status table to select one of the plurality of computer boards that is unused as the connection destination computer board; and in the terminal device-to-computer board encrypted communication path establishment; step:

the terminal device transmits a request for connection to the selected connection destination computer board to the management server via the terminal device-to-management server encrypted communication path;

the management server generates an encryption key that is to be used for the encrypted communication path established between the terminal device and the connection destination computer board;

the management server transmits via the computer board-to-management server encrypted communication path the request for connection from the terminal device and the generated encryption key to the connection destination computer board;

the connection destination computer board judges whether the terminal device can be connected thereto in response to the request for connection received from the management server, and transmits a result of the judgment to the management server via the computer board-to-management server encrypted communication path;

the management server transmits the result of the judgment received from the connection destination computer board and, when the result of the judgment indicates that the terminal device can be connected to the connection destination computer board, the generated encryption key to the terminal device via the terminal device-to-management server encrypted communication path; and the terminal device establishes the terminal device-to-computer board encrypted communication path upon reception of the generated encryption key transmitted from the management server.

3. A communication system according to claim 1, wherein, when the terminal device and the connection destination computer board terminate the terminal device-to-computer board encrypted communication path established:

the terminal device transmits a termination request for the terminal device-to-computer board encrypted communication path, into which computer board ID information of the connection destination computer board is incorporated, to the management server via the terminal device-to-management server encrypted communication path;

the management server transmits the received termination request to the connection destination computer board via the computer board-to-management server encrypted communication path;

the connection destination computer board transmits to the management server a termination response to the termination request received from the management server via the computer board-to-management server encrypted communication path;

the management server transmits to the terminal device the termination response received from the connection destination computer board via the terminal device-to-management server encrypted communication path;

the terminal device and the connection destination computer board execute a terminal device-to-computer board encrypted communication path termination step that, by discarding the encryption key, terminates the terminal device-to-computer board encrypted communication path;

the management server gives a power-off instruction to the connection destination computer board after the terminal device-to-computer board encrypted communication path is terminated; and the connection destination computer board executes, upon reception of the instruction from the management server, a computer board power-off step that cuts off power supply of the connection destination computer board.

4. A communication system according to claim 3, further comprising a storage device that stores data read by the plurality of computer boards, wherein, in the computer board allocation step, the management server instructs the selected connection destination computer board to turn on power and read information necessary for the terminal device from the storage device, as the instruction of the activation; and the connection destination computer board turns on power and reads the information necessary for the terminal device, from the storage device in the activation instructed by the management server.

5. A communication system according to claim 4, wherein the management server further instructs the connection destination computer board to rewrite the information to the storage device when the connection destination computer board executes the computer board power-off step.

6. A communication system according to claim 1, wherein the computer board use status table retains:

the virtual computer board ID corresponding to at least one of the plurality of computer boards, computer board identification information that identifies a computer board corresponding to the virtual computer board ID, a use status that indicates whether the computer board is in use, user information that indicates, when the use status of the computer board is one of "in use" and "allocated", a user who is using the terminal device to which the computer board that is one of "in use" and "allocated" is allocated, and a read computer board ID indicating a computer board ID read by the allocated and activated computer board.

7. A communication system according to claim 6, wherein, when the terminal device and the connection destination computer board terminate the terminal device-to-computer board encrypted communication path:

the terminal device transmits a termination request for the terminal device-to-computer board encrypted communication path, into which the virtual computer board ID information of the connection destination computer board is incorporated, to the management server via the terminal device-to-management server encrypted communication path;

the management server specifies, as the connection destination computer board corresponding to the termination request, a computer board that corresponds to the virtual computer board ID and the read computer board ID regarding the terminal device, by referring to the computer board use status table;

the management server transmits the termination request to the specified connection destination computer board corresponding to the virtual computer board ID via the computer board-to-management server encrypted communication path;

the connection destination computer board transmits to the management server a termination response to the termination request received from the management server via the computer board-to-management server encrypted communication path;

the management server transmits to the terminal device the termination response received from the connection destination computer board via the terminal device-to-management server encrypted communication path;

the terminal device and the connection destination computer board execute a terminal device-to-computer board encrypted communication path termination step that, by discarding the generated encryption key, terminates the terminal device-to-computer board encrypted communication path;

the management server gives a power-off instruction to the connection destination computer board after the terminal device-to-computer board encrypted communication path is terminated; and the connection destination computer board executes, upon reception of the instruction from the management server, a computer board power-off step that cuts off power supply of the connection destination computer board.

8. A communication system according to claim 1, further comprising a validation server that verifies a certificate, wherein:

the management server requests the validation server to verify the certificate of at least one of the terminal device and the connection destination computer board, when performing authentication of the at least one of the terminal device and the connection destination computer board in at least one of the terminal device-to-management server encrypted communication path establishment step and the computer board-to-management server encrypted communication path establishment step;

the validation server transmits a result of the validation of the certificate to the management server as a response; and the management server judges, when the result of the validation transmitted as a response from the validation server indicates success, that the authentication of the at least one of the terminal device and the connection destination computer board has succeeded.

* * * * *